May 22, 1951     C. R. CARTER     2,553,895
FISHING TACKLE
Filed Oct. 6, 1947
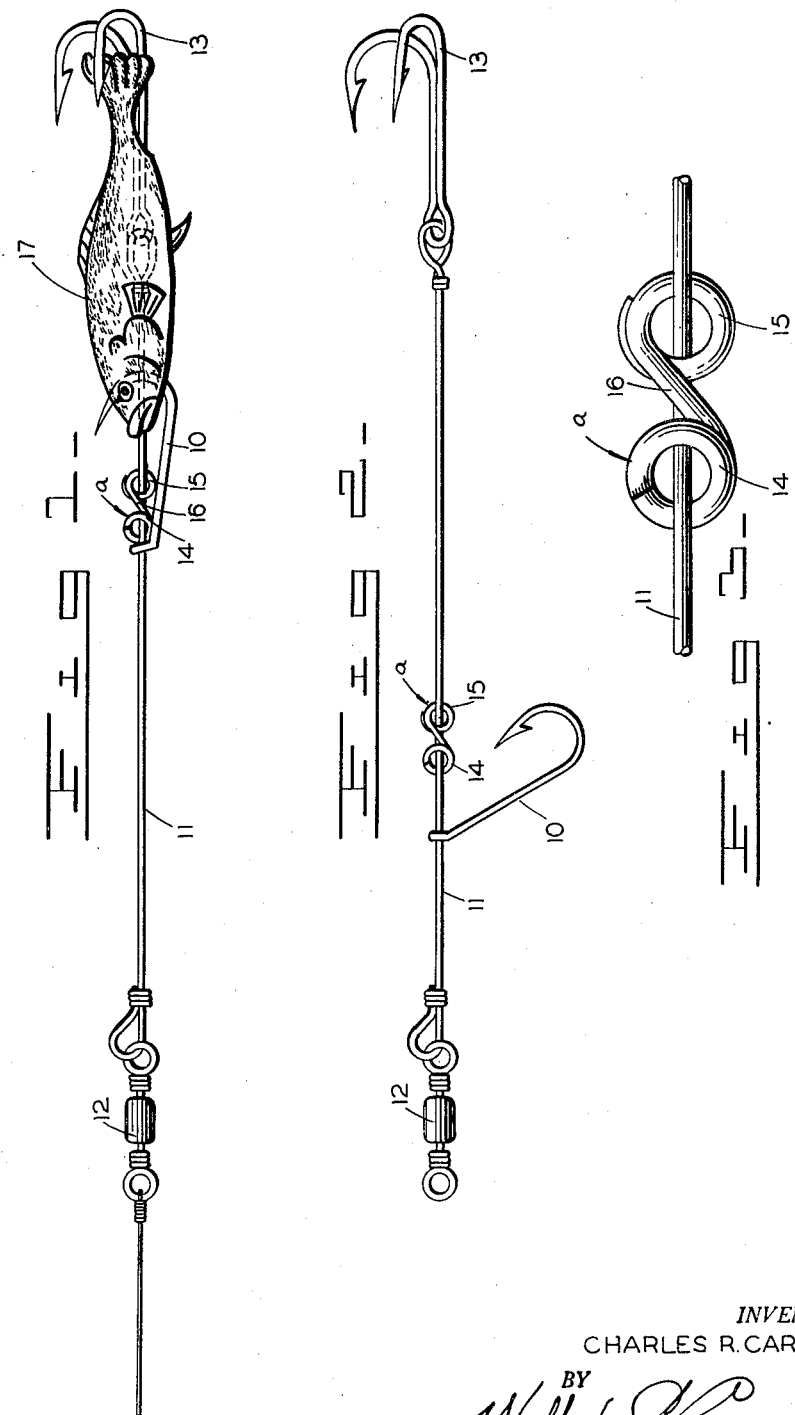
INVENTOR.
CHARLES R. CARTER
BY Wilfred Lawson
ATTORNEY Patented May 22, 1951

2,553,895

UNITED STATES PATENT OFFICE 2,553,895

FISHING TACKLE

Charles R. Carter, Santa Barbara, Calif.

Application October 6, 1947, Serial No. 778,111

1 Claim. (Cl. 43—44.2)

My invention relates to fishing tackle and more particularly to a bait saving device.

The object of my invention is to provide a bait saving device adapted to be attached to a wire leader of fishing tackle to prevent the loss of the bait in casting.

Another object of my invention is to provide a device of the character indicated above which is adapted to be adjusted on the leader relative to the double or treble hook secured on the end of the leader, so that a minnow used for casting bait will retain its natural shape and appearance and will not become so easily torn and mangled, as has been the case heretofore, when a minnow has been used as bait while casting.

Other objects of my invention may appear in the following specification describing my invention with reference to the accompanying drawing illustrating a preferred embodiment of my invention.

It is, however, to be understood that my invention is not to be limited or restricted to the exact construction and combination of parts described in the specification and shown in the drawing, but that such changes and modifications can be made which fall within the scope of the claim appended hereto.

In the several figures of the drawing similar parts are designated by similar reference characters and Figure 1 is an elevational side view of a bait saving device according to my invention mounted on a wire leader of fishing tackle, showing the same ready for casting.

Figure 2 is a view in elevation of the device with one hook shifted forwardly on the leader.

Figure 3 is an enlarged detail view of the intermediate member between the hooks.

The bait saving device forming the subject matter of my invention comprises a fish hook 10 slidably mounted on a wire leader 11 or the like provided on its upper end with a swivel 12 adapted to be secured to a fishing line and on its lower end with a double or treble fish hook 13 removably and exchangeably secured to said leader.

Below the upper fish hook 10 a locking device a is adjustably mounted on the leader 11 and is adapted to be secured in adjusted position against accidental sliding movement on the leader, thereby preventing any downward sliding movement of the upper fish hook 10.

The locking device a is preferably made from one continuous piece of resilient non-corroding wire and comprises a circular loop or ring 14 which may comprise a single turn of the wire, a second circular loop or ring 15 which also comprises one turn of the wire and an intermediate portion 16, connecting the two rings with each other by forming a continuation of an end of one ring to an end of the other ring.

The locking device a is mounted on the leader 11, so that the latter extends through the two loops or rings 14 and 15 permitting the locking device to be slid up or down on said leader, but maintaining sufficient frictional engagement therewith to prevent accidental movement thereon.

When a minnow 17 is to be put in position to serve as casting bait, the lower hook 13 is removed from the leader 11 and the latter is pushed into the mouth of the minnow and through its stomach until it comes out through the tail. The lower hook 13 is again secured to the leader, which is then retracted until the shank of the lower hook is embedded in the minnow and only the barbs of the lower hook are showing.

The body of the minnow 17 is then smoothed out around the shank of the lower hook and the leader, keeping the locking device a and the upper hook above the head of the minnow.

The upper hook 10 is then brought up through the jaw of the minnow and out through the top of the head of the minnow.

The locking device is moved against the eye of the upper hook 10 and frictionally maintains this position on the leader 11 by reason of the extension of the leader through the two rings 14 and 15.

The inherent resiliency of the locking device causes the two ring portions of said device to engage the wire leader 11 clampingly and secure the locking device in adjusted position, whereby the upper hook 10 is prevented from sliding downwardly on the leader, so that the natural appearance of the minnow is preserved longer and accidental loss of the bait in casting is prevented.

I claim:

In a fishing tackle of the character described, a wire leader, a fish hook removably attached to one end of the leader, a second hook having a shank eye through which the leader freely passes whereby the second hook may slide freely on the leader, and a locking device comprising a length of wire bent into the form of a figure of eight to provide two interconnected angularly disposed rings and adapted to be frictionally slidable on the leader between the shank eye of said second hook and the connection of the first hook with the leader, for adjustment on the leader, to limit the movement of the second hook toward the first hook.

CHARLES R. CARTER.

REFERENCES CITED

The following references are of record in the file of this patent:

UNITED STATES PATENTS

| Number | Name | Date |
|---|---|---|
| 691,407 | Pacetty | Jan. 21, 1902 |
| 692,233 | Bradley | Feb. 4, 1902 |
| 849,036 | Zimmerman | Apr. 2, 1907 |
| 979,891 | Schield | Dec. 27, 1910 |
| 1,330,147 | Stitzer | Feb. 10, 1920 |
| 1,717,376 | Ellerbrock | June 18, 1929 |
| 2,000,954 | Hopkins | May 14, 1935 |
| 2,253,688 | Collins | Aug. 26, 1941 |

FOREIGN PATENTS

| Number | Country | Date |
|---|---|---|
| 4,335 | Great Britain | 1896 |